United States Patent [19]

Wilde et al.

[11] 4,131,500
[45] Dec. 26, 1978

[54] TIRE BUILDING DRUM

[75] Inventors: Michael A. Wilde, Winsley; David J. Lucas, Melksham, both of England

[73] Assignee: Avon Tyres Limited, Wiltshire, England

[21] Appl. No.: 821,418

[22] Filed: Aug. 3, 1977

Related U.S. Application Data

[63] Continuation of Ser. No. 638,854, Dec. 8, 1975, abandoned.

[30] Foreign Application Priority Data

Dec. 9, 1974 [GB] United Kingdom ............... 53219/74

[51] Int. Cl.² .......................................... B29H 17/12
[52] U.S. Cl. .................................. 156/131; 156/132; 156/402; 156/415; 156/417
[58] Field of Search .................. 156/123 R, 131, 132, 156/133, 394 R, 398, 400, 401, 402, 403, 414–420

[56] References Cited

U.S. PATENT DOCUMENTS

| | | | |
|---|---|---|---|
| 2,367,831 | 1/1945 | Manson | 15.6/415 |
| 3,093,531 | 6/1963 | Frohlich et al. | 156/400 |
| 3,121,651 | 2/1964 | Borglin et al. | 156/398 |
| 3,140,216 | 7/1964 | Shilts et al. | 156/415 |
| 3,375,154 | 3/1968 | Ruttenberg et al. | 156/418 |
| 3,698,987 | 10/1972 | Woodhall et al. | 156/401 |
| 3,785,894 | 1/1974 | Ling et al. | 156/415 |
| 3,837,968 | 9/1974 | Marra | 156/420 |
| 3,853,653 | 12/1974 | Olbert et al. | 156/128 R |
| 3,887,423 | 6/1975 | Gazuit | 156/402 |
| 4,045,277 | 8/1977 | Habert et al. | 156/419 |

Primary Examiner—John E. Kittle
Attorney, Agent, or Firm—Oblon, Fisher, Spivak, McClelland & Maier

[57] ABSTRACT

This invention is a tire building drum for building the stage - I carcass of a tire corresponding to the initial part of the carcass before breaker belts and the tread are subsequentially applied. The invention is in a drum and a method of using it whereby the components for making the stage - I carcass can be expanded substantially radially say between 25% and 35% of the drum radius to ensure that the side wall components extend generally in planes perpendicular to the drum axis during crowning and includes fillers fitted to or attached to the beads which can be substantially undistorted in those planes and will be similarly substantially undistorted in use at the vital area where a tire is in contact with the wheel rim.

14 Claims, 10 Drawing Figures

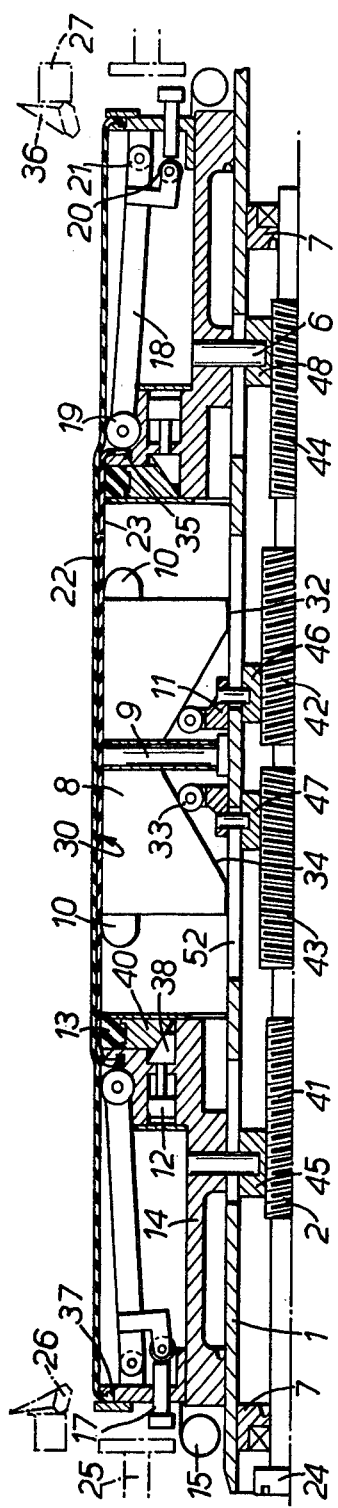
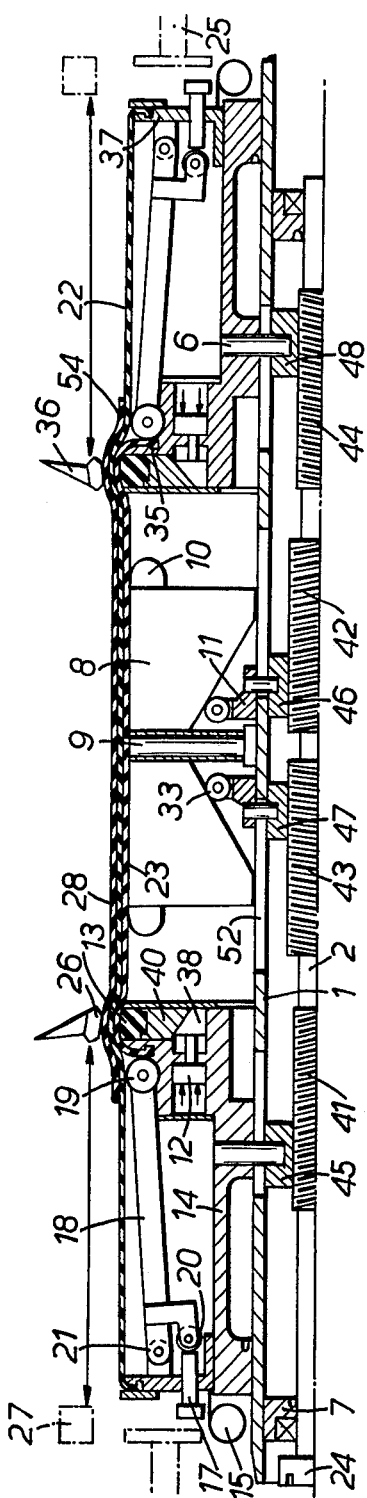
FIG.1.
FIG.2.

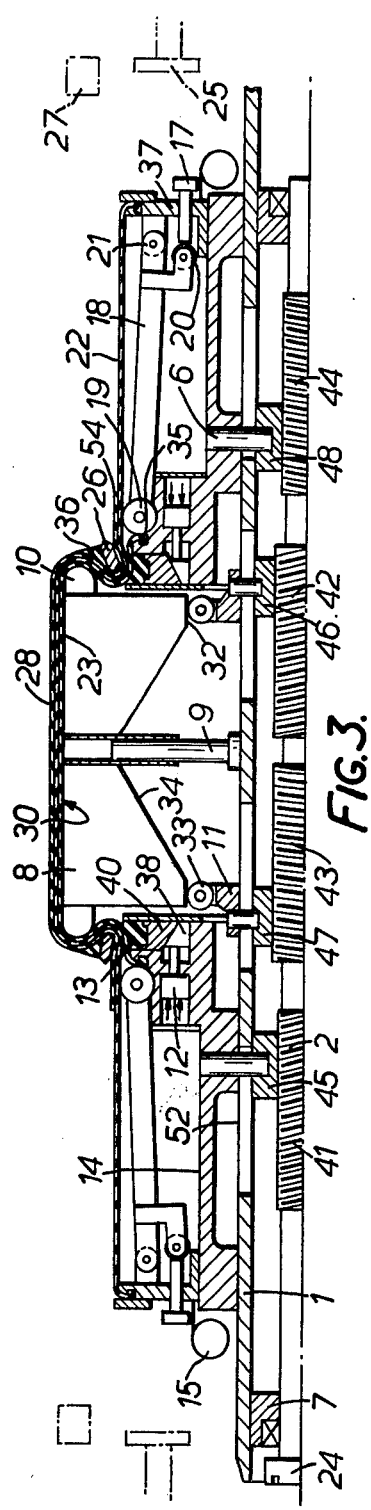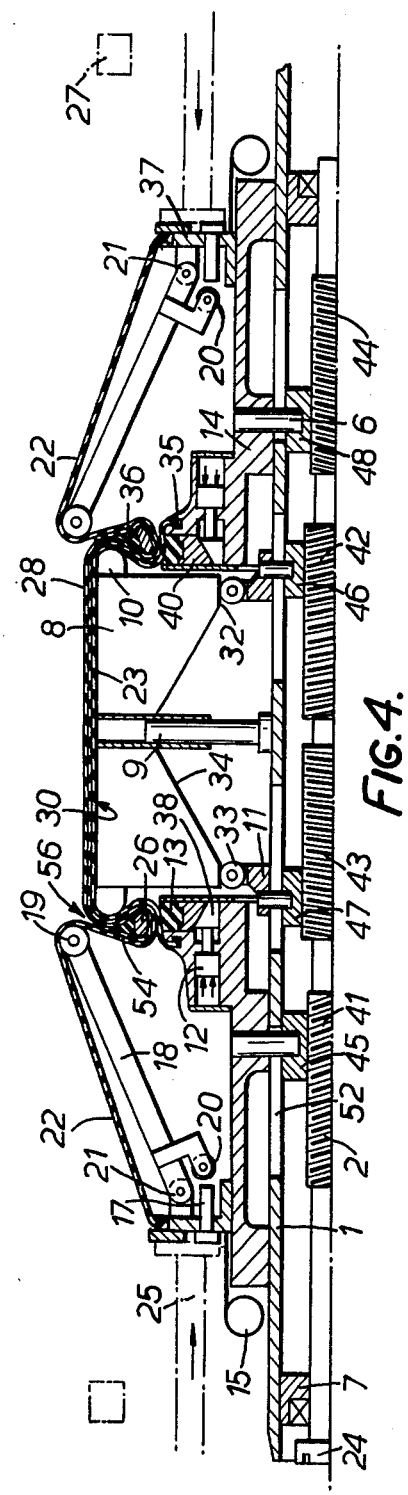

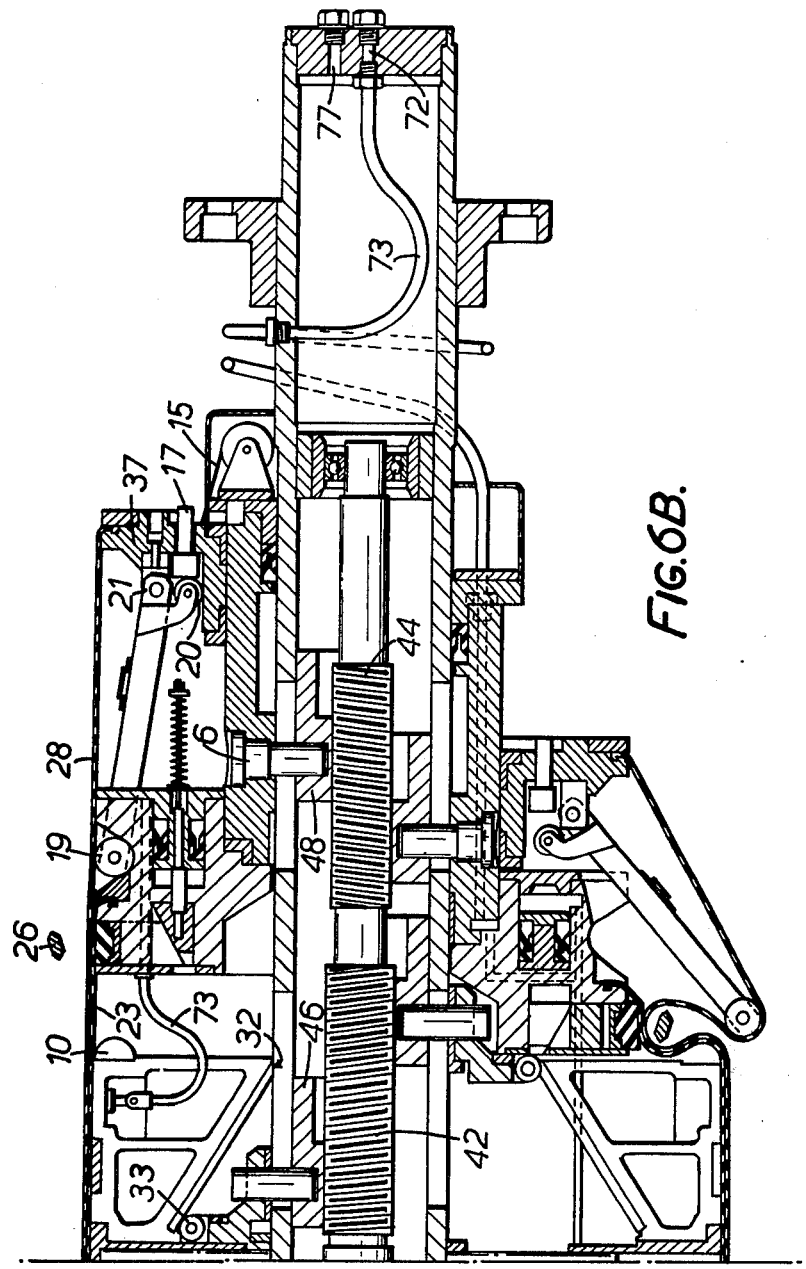

TIRE BUILDING DRUM

This is a continuation, of application Ser. No. 638,854, filed Dec. 8, 1975 now abandoned.

BACKGROUND OF THE INVENTION

Field of the Invention

This invention relates to a method of building a tyre carcass.

SUMMARY OF THE INVENTION

One object of the present invention is to provide a drum enabling both conventional cross-ply tyres and monoply radial tyres for both passenger and large commercial vehicles to be easily manufactured, but in particular giant tubeless radial tyres, for which no satisfactory drum exists.

According to one aspect of the invention a tyre-building drum for building the stage-I carcass of a tyre is arranged to expand radially by a distance of the order of 25-35% whereby fillers at the beads can extend approximately in planes perpendicular to the drum axis while the drum is in the expanded state. That not only enables the fillers to be substantially undistorted in the stage-I carcass, but also in the tyre when fitted to the wheel rim. That gives the tyre great flexibility at the wheel rim and, in the case of tubeless tyres, assists also in maintaining a good seal, while in the case of giant tyres-for lorries or tractors-with hexagonal section beads, it enables the tyres to have low built-in stresses.

The invention includes a method of building a tyre in which tyre components including beads and bead fillers are laid up on a drum, and the drum is expanded so that the crown is radially beyond the fillers while the stage-I carcass is being formed.

The invention includes a tyre made on a drum as defined or by a method as defined, and includes a tyre in which bead fillers extend generally perpendicularly from the beads in the side wall, with substantially no deformation.

According to other aspects of the invention a tyre-building drum has any one or more of the following features;

the drum may be defined by a circumferential ring of drum segments, associated with means for moving each segment radially to expand the drum.

each segment may be expanded by co-operation between a radially-inner inclined surface on the segment and a cam follower or driver driven by the moving means;

the generally cylindrical surface defined by the outer surfaces of the segments may be enclosed by a sleeve to enable the interior to be pressurized to support the tyre components between segments, and such sleeve may be elastic to be capable of expanding with the drum;

there may be a continuous expansible ring at or near each end of the drum and means for expanding it radially in relation to the drum to lock tyre components with beads positioned around them; such rings may be continuous elastic rings; axially driven wedges can co-operate with inclined cam surfaces to expand the rings;

expansion of the drum can be simultaneous with axially-inward movement of such lock rings so that the tyre components are not stretched during crowning; after expansion of the drum has been completed, a little further movement of the lock rings enables the carcass to be formed with an "undercut" at each side; axially beyond the drum, the drum surface may be continued as the surface of a flexible sleeve which is associated with actuators for deforming the sleeve outwardly to lash back the ends of the tyre components beyond the beads against the crown; the actuators may operate a circumferential ring of pivoted arms on link mechanisms causing first a radial outward movement and then a simultaneous axially inward and radial movement.

The invention includes a method of building a tyre carcass performed using a machine as defined herein.

According to a further aspect of the invention, in a method of building a tyre carcass, tyre components are built up around an expansible drum, beads are laid around the components, the drum is expanded locally under the beads to lock the components against the beads, and then the drum is expanded radially to crown the tyre.

Expansion of the drum may comprise simultaneous radial movement of drum components and axial movement of bead locks, and that may be followed by slight movement of bead locks alone to provide an "undercut".

Expansion of flexible extensions of the drum surface beyond the axial ends of the drum can lash back the ends of the tyre components.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 1 to 5 are diagrammatic half-elevations in section of a drum structure for making the first stage carcass of radial tyres, the figures showing successive stages in the manufacturing operation;

FIGS. 6A and 6B is a detailed sectional elevations corresponding to FIGS. 1 to 5, with the components above the center line shown in the drum contracted positions and those below the centre line shown in the drum expanded positions; with the lashbacks in their forward positions.

DETAILED DESCRIPTION OF THE PREFERRED EMBODIMENTS

Figure 7:
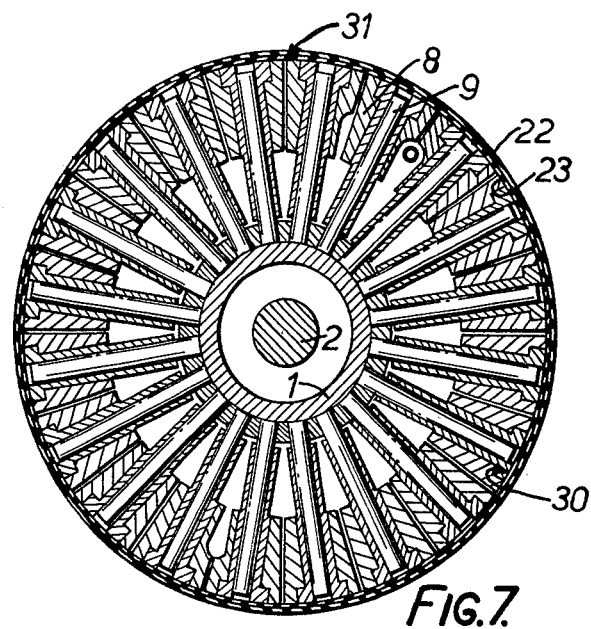
FIG. 7 is a section on the Line VII—VII in FIG. 6A with the components in the drum contracted positions.

The drum has a radially expansible body consisting of a circumferential ring of segments 8, whose outer cylindrical surfaces define a cylinder 30 when the structure is contracted as shown best in FIG. 7; there are then slight gaps 31 between adjacent segments 8. Each segment 8 has a pair of axially outwardly and radially inwardly inclined cam surfaces 34 leading each to an inner flat surface 32 against which a cam actuator 33 bears when the drum is expanded as shown in FIG. 3. A rubber sleeve 23 surrounds, and expands with, the cylindrical surface 30, and has its ends 35 sealed in opposite end frames 14 so that the area within the drum can be pressurized with low pressure air from an inlet 77 to support the tyre components while they are being laid up on the drum. Radial expansion and contraction of each segment 8 is guided by a radial post 9.

In the initial condition the drum is contracted as shown in FIG. 1 and the tyre components 28 are positioned around an external rubber sleeve 22 surrounding the sleeve 23 and clamped at its ends in end flanges 37 one at the outer end of each frame 14 (FIG. 2).

Figure 8:
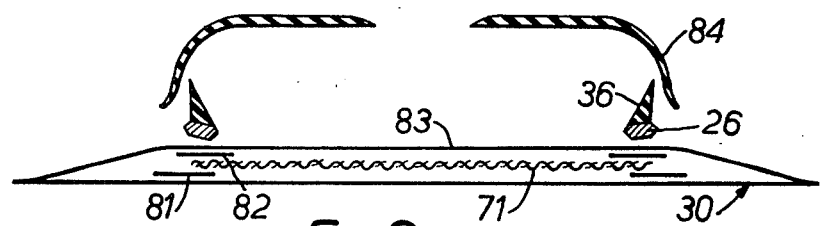
FIGS. 8 and 9 are diagrams of the type components respectively during stage - I laying up, and in the tyre when on the wheel.

Chafers 81, a lining 71, chippers 82, and ply 83 are wrapped around the drum as described in more detail, and shown diagrammatically in FIG. 8.

Figure 6A:
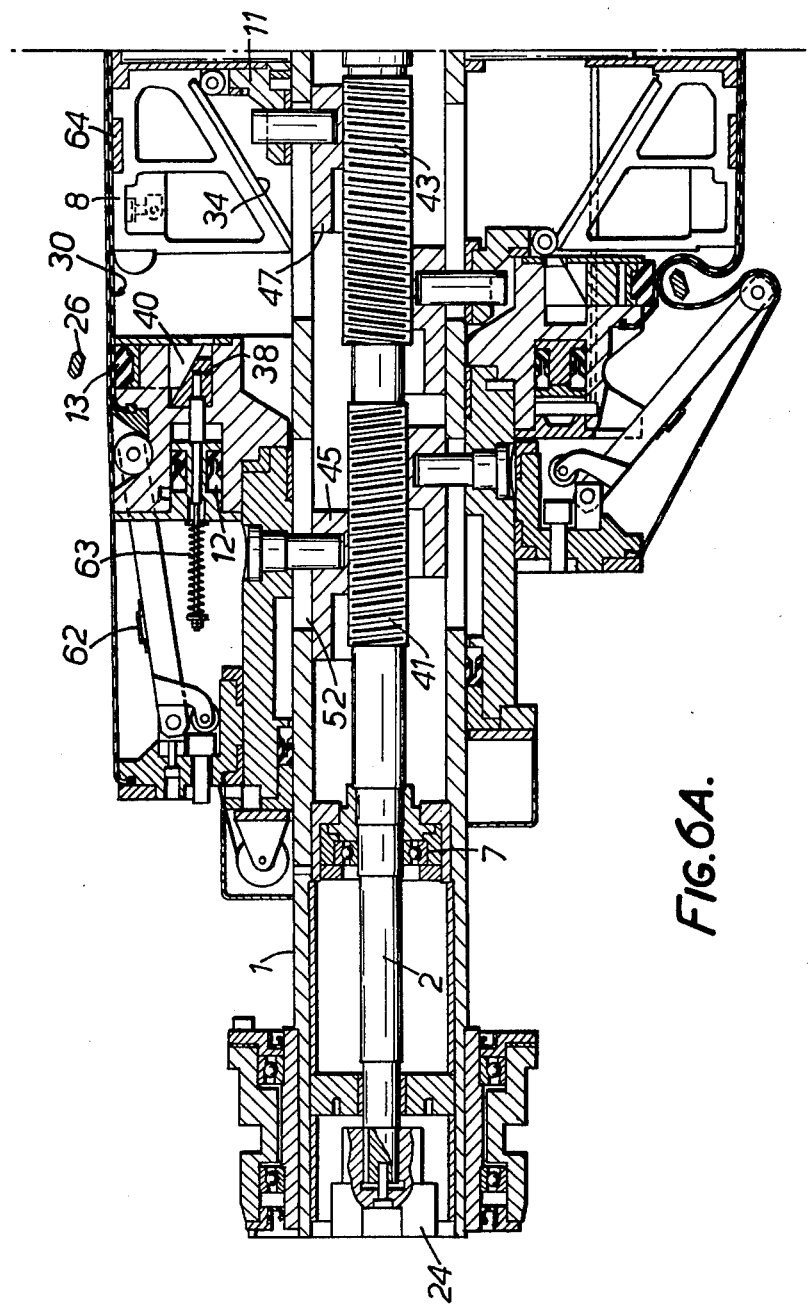

Circumferential steel beads 26 are then moved from the withdrawn position in carriers 27 as shown in FIG. 1 to positions slightly inward of the outer ends of the components 28 as shown in FIG. 2. Then rubber lock rings 13 — one at each end of the drum — are expanded by an annular pneumatic actuator 12 mounted on each frame 14 by pressurizing a port 72 and air lines 73 to the actuators 12 (FIG. 6). The actuators have wedge like cam surfaces 38 acting on corresponding surfaces of radial operating members 40 for the lock rings 13. FIG. 2 shows how the rings 13 have expanded immediately under the beads 26. The sleeves 22 and 23 have stretched somewhat and hold the components 28 against the beads.

The drum is now crowned by expanding the segments 8, and that is done by rotating a hollow cylindrical shaft 1 which surrounds a fixed central leadscrew 2 within internal bearing and seal assemblies 7 at the ends of the shaft 1. The leadscrew 2 has two right hand threaded portions 41 and 42 and two left hand threaded portions 43 and 44, and each co-operates with a different phosphor bronze nut 45, 46, 47 or 48, respectively which are rotated with the shaft 1 by reason of radial pins 6 fixed to the nuts, and extending radially through axial slots 52 in the shaft 1. The outer nuts 45 and 48 are connected by the pins 6 to the respective end frames 14, and the inner nuts 46 and 47 are connected to carrier rings 11 for the cam drivers 33.

Thus, as the shaft is rotated by a drive from the machine headstock while the leadscrew 2 is held stationary by a coupling half 24 coupled to a coupling on the tail stock, the end frames 14 move axially inwards and the cam drivers 33 move axially outwards.

The camming action of the drivers 33 on the cam surfaces 34 expands the drum segments 8, and at the same time the frames 14 carrying the lock rings 13 move axially to allow the sleeves 22 and 23 and the components 28 to take up the crowned position shown in FIG. 3. From the inner corners of the beads the components extend outwardly both axially and radially and then curve back axially around ears 10 carried at the outer corners of the segments 8. The distance between the beads 26 along the components during crowning is determined by the relationship between the pitch of the threaded portions 41 and 44 and that of the portions 42 and 43.

The surfaces 32 allow the segments to remain in their expanded position while a little further axially-inward movement of the frames 14 gives the undercut shape described. A rubber extrusion bead filler 36 is inserted in the undercut; that filler 36 could have been previously attached to the bead 26 and laid up with the bead by the carrier 27.

The static coupling half on the tailstock of the machine (not shown) is now disengaged from the coupling half 24. The free ends 54 of the components beyond the beads 26 are now lashed back by expanding actuators 25, one at each end of the machine. They first encounter pins 17 and move them axially inwardly in the end frames 14 so that they strike rollers 20 and rock arms 18 about pivots 21 on the end frames. Rollers 19 on the inner ends of the arms 18 bend the free ends 54 up, and then further movement of the actuators 25 moves the end flanges 37 inwardly along their frames 14 until as shown in FIG. 4, the turned-up free ends 54 have been forced against the corners of the crowned components. During the action the sleeve 22 restrains the rollers 19 radially.

A bond is established between the lash back and the crown 56, as with bonds between components, either by the tackiness of the rubber, or by use of a solvent, or both.

Finally the actuators 25 are retracted to allow constant tension springs 15 to pull the flanges 37 back along the frames 14. Tension in the outer rubber sleeve and in rubber bands 62 around the arms 18 (FIG. 6) assist the springs 15 to move the rollers 19 and their arms 18 radially inwards again. Side walls 84 are then fitted and stitched to the ply.

The drum is then restored to the initial position by exhausting the air inlet 72 and releasing the actuators 12 so that the bead lock rings 13 can be collapsed by their own tension, by tension in the outer sleeve 22, tension in rubber segment retaining rings 64 (FIG. 6) and by the action of compression springs 63 on the actuator shafts. The coupling on the leadscrew 2 is re-engaged to hold it stationary and the shaft 1 is driven in reverse to return the cam drivers 33 to the initial position.

Figure 5:
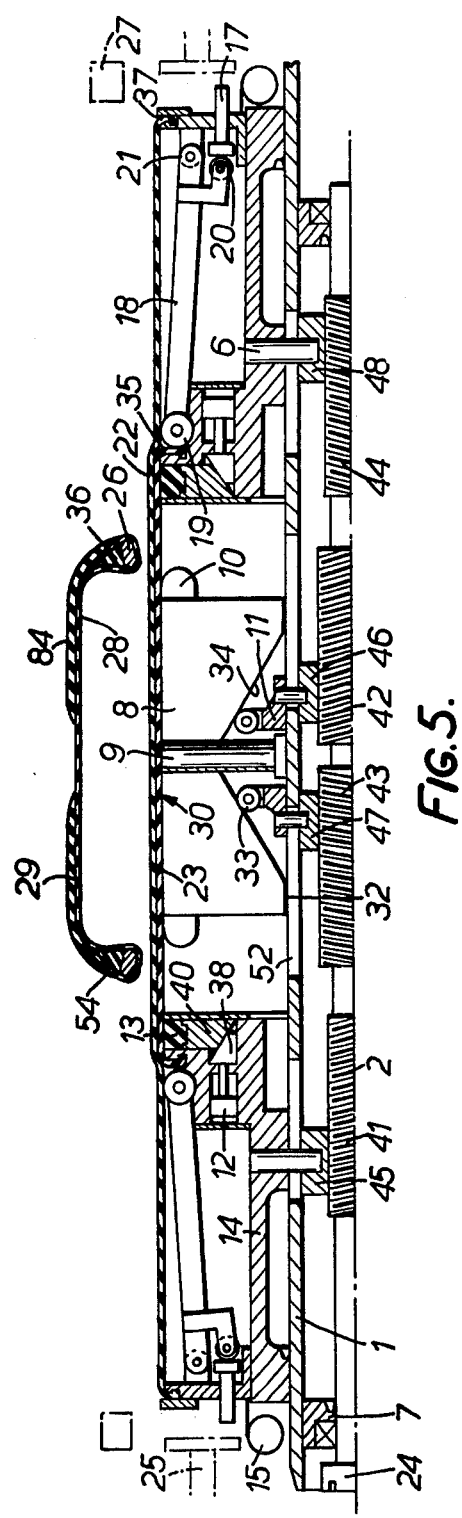

The completed carcass is shown in FIG. 5 ready for removal after air has been expressed by stitching rollers.

The bead set dimension can be adjusted within 3 mm of the nominal dimension at the carriers 27, and it can be adjusted for different applications by removing the sleeves 22 and the segments 8. The ears 10 are replaced by ears of the appropriate different size. Then the segments 8 and sleeves 22 and 23 are refitted. It may be necessary to fit sleeves of different length if the adjustment has been a substantial one.

The drum enables a diametrical expansion from 21" to 28" e.g. 33⅓% increase to be achieved in one example of drum.

It is now convenient to describe components for a typical tubeless monoply giant tyre and reference will be made to the diagrams in FIGS. 8 and 9 which show approximately how the components are positioned on the drum during the first stage of building up the carcass 29 of FIG. 5, and show approximately how the components are positioned in relation to the wheel when the complete tyre is fitted and inflated. Some of the components have already been referred to in describing the operation of the drum.

Rubber chafers 81 are first applied at each end of the drum; and the the lining 71 of fabric is wrapped around the drum covering the inner edges of the chafers with its trailing edge joined to its leading edge. The chafers are for strengthening the part of the tyre where the seal is made with the wheel which is particularly liable to tear. Then a chipper 82 is wrapped around the joint between the lining and each chafer and the the ply 83 consisting of fiber reinforced rubber sheet is wrapped around all the components already built up ready for reception of the beads 26 as previously described.

In order to establish an effective seal with a giant tubeless tyre for example, for a lorry or a tractor, it is necessary to have a bead of the elongate hexagon section shown in FIG. 8 which consists of a number of strands of steel wire united in rubber to have the section shown. The filler 36 has already been referred to and that can either be united with the bead before the bead is laid up on the drum so that the two are laid up together or it can be laid over the bead when the bead is on the drum. Side walls 84 are applied at each side over the corresponding filler 36.

FIGS. 2 to 8 show that when the fillers 36 are laid up on the drum they lie generally in respective planes through the bead rings perpendicular to the axis of the drum, and FIGS. 3, 4 and 5 show how when the free ends 54 are lashed back and the side walls 84 are applied, and the carcass is released when the drum is contracted, the fillers 36 remain generally in the same plane so that they are only slightly distorted if at all during the Stage-I process, that is to say, the process producing the carcass 29 of FIG. 5. That minimum distorsion of the fillers 36 is achieved by expanding the drum radially sufficiently for the crown to be radially further from the drum axis than the outer edges of the fillers 36 as can be seen in FIGS. 3 and 4 and to achieve that it is necessary to have the radial drum expanded to the order of 30% to $33\frac{1}{3}$% as already described.

Figure 9:
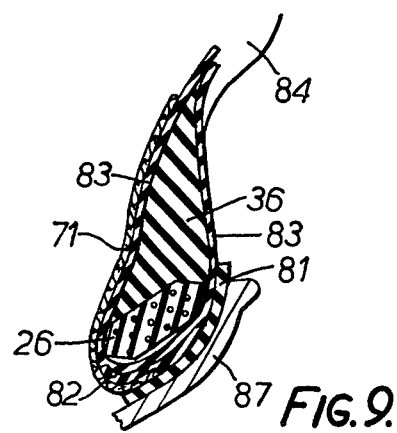

When the Stage-I carcass 29 is applied in the Stage 2 process by the addition of breaker belts and a tread and the tyre is moulded and fitted to a wheel, the components are generally in the positions shown in FIG. 9 where the wheel rim is indicated at 87. FIG. 9 shows that the fillers 36 are still substantially undeformed and extend generally in planes perpendicular to the wheel axis. During running of the wheel there is considerable deflection and rolling movement of the tyre in relation to the rim 87 at that point where the seal is established and the fact that the fillers 36 are substantially undeformed in the free position of the tyre gives them greater ability to flex in any direction during use, and improves the strength and wear resisting properties of the tyre in that vital region where the seal is established. Obviously, many modifications and variations of the present invention are possible in light of the above teachings. It is therefore to be understood that within the scope of the appended claims the invention may be practiced otherwise than as specifically described herein.

What is claimed is:

1. A tyre building drum for building a stage-I carcass of a tyre which comprises:
    a circumferential ring of drum segments defining a cylindrical surface on which tyre components can be laid up,
    a radial post disposed centrally of each of said segments upon which each of said segments can move radially and be guided during such radial movement so as to expand or contract the cylindrical surface;
    an expansible ring at each end of the drum and means for expanding the rings to lock the components against surrounding beads; and
    means arranged to expand the drum radially by movement of the drum segments radially outwardly upon said posts by at least 25% of the radius of the drum and substantially radially beyond the expanded bead ring each segment having a surface cooperating with the expanding means for enabling the segment to act radially against the components throughout the expansion movement, and each segment having a surface for holding the components axially outwards in the expanded state of the drum, and lash-back means arranged to lash-back the part of the components beyond the expansible rings by acting through the components against the holding surface.

2. A drum as claimed in claim 1 in which each segment is in two sections side by side axially.

3. A drum as claimed in claim 2 in which each drum segment section has a radially inwardly inclined cam surface extending from near the centre of the segment to near the axial edge of the segment; and the moving means comprises a cam driver co-operating with the inclined surfaces.

4. A drum as claimed in claim 3 in which the inclined surface of each segment section leads to an axial surface at the outer edge of the section along which the cam driver can move without expanding the section further.

5. A drum as claimed in claim 1 comprising an elastic sleeve enclosing the generally cylindrical surface defined by the outer surfaces of the drum segments and capable of expanding with the drum 6. A drum as claimed in claim 1 including axially driven wedge means co-operating with inclined cam surfaces to expand the expansible rings.

7. A drum as claimed in claim 6 in which after expansion of the drum, further axial movement of the expansible rings is arranged to occur.

8. A drum as claimed in claim 1 including means axially beyond each end of the drum surface arranged to be expanded radially after the drum has been expanded to lash back against the crown, the ends of tyre components axially beyond the beads.

9. A drum as claimed in claim 8 in which the means axially beyond said each end of the drum surface is defined by a flexible sleeve surrounding the drum and extending axially beyond its ends.

10. A drum as claimed in claim 8 including actuators for expanding the means axially beyond each end of the drum surface and consisting of axially operable members co-operating with a circumferential ring of pivoted arms arranged to move radially outwardly to expand the surface.

11. A drum as claimed in claim 10 in which linkage between the actuators and the pivoted arms is designed to cause first a radial outward movement of the arms and then an axially inward movement.

12. A drum as claimed in claim 11 in which the arms have rollers on their operating ends for producing a rolling action against the tyre components.

13. A drum as set forth in claim 1, wherein:
    each segment has axially extending ears at its outer corners for locating the expanded components axially outwards of the beads.

14. A method of making a stage-I carcass of a tyre, comprising:
    laying up tyre components on a cylindrical surface of a multisegment drum;
    expanding a ring at each end of said drum to lock said components against beads surrounding said components at each end of said drum;
    mounting fillers on said beads so as to substantially extend radially from said beads;
    subsequently expanding said drum segments substantially radially beyond said beads and said fillers while the segments act against the components throughout the expanding movement;
    moving said rings axially inwardly; and
    axially extending said tyre components beyond said beads and lashing said components back against said expanded components while said drum remains so expanded such that said fillers lie substantially radially in said expanded carcass, while surfaces on the segments act against the components to locate them radially against the lash-back movement.

* * * * *